Patented Nov. 11, 1947

2,430,721

UNITED STATES PATENT OFFICE 2,430,721

N-NITROSO-N-ARALKYL-ARYLAMINES AS INSECTICIDES

Elbert C. Ladd, Passaic, N. J., assignor to United States Rubber Company, New York, N. Y., a corporation of New Jersey No Drawing. Application November 29, 1944, Serial No. 565,801

20 Claims. (Cl. 167—30)

1

This invention relates to improvements in insecticides. The term "insecticide" is considered to include larvaecides, arachnicides, and insect repellents or insectifuges, and is to be construed in accordance with the Insecticide Act of 1910, section 6.

I have found that N-nitroso-N-aralkyl-arylamines are effective insecticides. These compounds may be prepared in a known manner by nitrosating the corresponding N-aralkyl-arylamine by a treatment with an acid, such as sulfuric or glacial acetic acid, and sodium nitrite [see Beilstein "Handbuch der Organischen Chemie," vol. 12, p. 1071 (4th edition)]. The N-nitroso-N-aralkyl-arylamine may be applied as a dust, undiluted or mixed with a powdered solid carrier, such as clay or talc, or as a liquid or a spray in a liquid carrier, as in solution in a suitable solvent, or suspended in a suitable non-solvent medium, for example, water. N-nitroso-N-aralkyl-arylamines may be used admixed with carriers that are active of themselves, for example, other insecticides, fungicides or bactericides.

The following examples describing tests on various N-nitroso-N-aralkyl-arylamines, viz., N-nitroso-N-benzylaniline; N-nitroso-N-benzyl-p-toluidine; N-nitroso-N-benzyl-1-naphthylamine; and N-nitroso-N-(β-phenethyl)-aniline, are given to illustrate the invention.

Example I

Two young bean plants, the first true leaves fully expanded, were sprayed with a ½% aqueous suspension of an N-nitroso-N-aralkyl-arylamine (as shown in the table below) containing 0.3% of proprietary wetting and emulsifying agents. The plants were sprayed in each case with an amount of the dispersion of the particular N-nitroso-N-aralkyl-arylamine sufficient to wet the entire leaf surfaces. The plants were then placed in an insect cage and infested with ten Mexican bean beetle larvae. Untreated plants were infested in the same way with Mexican bean beetle larvae in a separate cage. The amount of leaf surface eaten was observed at the end of six days. The following table shows the results expressed in percentage of leaf surface eaten in the case of untreated plants and plants treated with various N-nitroso-N-benzyl-arylamines. The 100% leaf surface eaten in the untreated plants means that the leaves were completely skeletonized. The results of the tests expressed in percent of leaf surface eaten is as follows:

| Chemical Tested | Per cent Leaf Surface Eaten | |
|---|---|---|
| | Plants Treated with Chemical | Untreated Plants |
| N-nitroso-N-benzyl-aniline | 5 | 100 |
| N-nitroso-N-benzyl-p-toluidine | 10 | 100 |
| N-nitroso-N-benzyl-1-naphthylamine | 5 | 100 |

Example II

Pinto bean leaves were sprayed with a 1% aqueous suspension of N-nitroso-N-(β-phenethyl)-aniline containing .07% of proprietary wetting and dispersing agent. The leaves thus treated, and untreated leaves, were infested with 10 to 15 Mexican bean beetles per leaf and placed in separate covered Petri dishes. After forty-eight hours, observations showed that the N-nitroso-N-(β-phenethyl)-aniline gave 100% kill of the beetles and prevented all feeding. In the untreated leaves there was normal feeding of the leaves with no mortality of the beetles.

Example III

Grapefruit leaves infested with citrus red mite were sprayed with aqueous suspensions of N-nitroso-N-benzyl-aniline of various concentrations. Each of the tests was made on at least four leaves infested with a total of 40 to 101 insects. Observations after 24 hours showed mortality of 87%, 77%, and 74% for concentrations of the N-nitroso-N-benzyl-aniline of 1 to 100, 1 to 300, and 1 to 900, respectively, whereas the mortality of the mites on untreated leaves was only 5% in this period of time.

Example IV

Broad bean leaves infested with 27 to 35 pea aphids per leaf were sprayed with a ½% aqueous suspension of N-nitroso-N-(β-phenethyl)-aniline. After 24 hours 53% of the aphids on the treated leaves had died, whereas the mortality of the aphids on untreated leaves was only 2% in this period of time.

Example V

Pinto bean leaves infested with 27 to 83 red spider mites per leaf were sprayed with a ½% aqueous suspension of N-nitroso-N-(β-phenethyl)-aniline. Observations after 24 hours showed a mortality of 94% of the mites on the treated leaves as compared to a mortality of only 2% on untreated leaves.

Having thus described my invention, what I claim and desire to protect by Letters Patent is:

1. An insecticidal composition comprising an N-nitroso-N-aralkyl-arylamine as an essential active ingredient, and a carrier therefor selected from the group consisting of clay and talc, and water containing a dispersing agent.

2. An insecticidal composition comprising an N-nitroso-N-benzyl-arylamine as an essential active ingredient, and a powdered solid carrier therefor.

3. An insecticidal composition comprising N-nitroso-N-benzyl-aniline as an essential active ingredient, and a powdered solid carrier therefor.

4. An insecticidal composition comprising N-nitroso-N-(β-phenethyl)-aniline as an essential active ingredient, and a powdered solid carrier therefor.

5. An insecticidal composition comprising N-nitroso-N-benzyl-1-naphthylamine as an essential active ingredient, and a powdered solid carrier therefor.

6. An insecticidal composition comprising an aqueous suspension of an N-nitroso-N-aralkyl-arylamine, said aqueous suspension containing a dispersing agent.

7. An insecticidal composition comprising an N-nitroso-N-benzyl-arylamine as an essential active ingredient, and a carrier therefor selected from the group consisting of clay and talc, and water containing a dispersing agent.

8. An insecticidal composition comprising an aqueous suspension of N-nitroso-N-benzyl-aniline, said aqueous suspension containing a dispersing agent.

9. An insecticidal composition comprising an aqueous suspension of N-nitroso-N-(β-phenethyl)-aniline, said aqueous suspension containing a dispersing agent.

10. An insecticidal composition comprising an aqueous suspension of N-nitroso-N-benzyl-1-naphthylamine, said aqueous suspension containing a dispersing agent.

11. The method which comprises applying an N-nitroso-N-aralkyl-arylamine to loci to be protected against insects.

12. The method which comprises applying N-nitroso-N-benzyl-aniline to loci to be protected against insects.

13. The method which comprises applying an N-nitroso-N-aralkyl-arylamine in a liquid carrier to loci to be protected against insects.

14. The method which comprises applying N-nitroso-N-benzyl-aniline in a liquid carrier to loci to be protected against insects.

15. The method of protecting plants subject to attack by insects which comprises applying an N-nitroso-N-aralkyl-arylamine to said plants.

16. The method of protecting plants subject to attack by insects which comprises applying N-nitroso-N-benzyl-aniline to said plants.

17. The method of protecting plants subject to attack by insects which comprises applying N-nitroso-N-(β-phenethyl)-aniline to said plants.

18. The method of protecting plants subject to attack by insects which comprises applying N-nitroso-N-benzyl-1-naphthylamine to said plants.

19. The method of controlling insects which comprises treating the insects with an N-nitroso-N-aralkyl-arylamine in a liquid carrier.

20. The method of controlling insects which comprises treating the insects with N-nitroso-N-benzyl-aniline in a liquid carrier.

ELBERT C. LADD.

REFERENCES CITED

The following references are of record in the file of this patent:

UNITED STATES PATENTS

| Number | Name | Date |
|---|---|---|
| 2,155,010 | Freeman | Apr. 18, 1939 |
| 2,302,384 | ter Horst | Nov. 17, 1942 |

OTHER REFERENCES

Dictionary of Organic Compounds, by Heilbron, 1943 ed., page 240. (Copy in Division 59.)